US006999026B2

(12) United States Patent
Loh et al.

(10) Patent No.: US 6,999,026 B2
(45) Date of Patent: Feb. 14, 2006

(54) INFORMATION MANAGEMENT AND CONTROL SYSTEM

(76) Inventors: Robert Loh, 7656 Burford La., McLean, VA (US) 22102; Richard Cole, 10009 Spring Lake Ter., Fairfax, VA (US) 22030; William Klepczynski, 3530 S. River Ter., Edgewater, MD (US) 21037

( * ) Notice: Subject to any disclaimer, the term of this patent is extended or adjusted under 35 U.S.C. 154(b) by 0 days.

(21) Appl. No.: 10/427,524

(22) Filed: Apr. 30, 2003

(65) Prior Publication Data

US 2003/0179132 A1    Sep. 25, 2003

Related U.S. Application Data

(62) Division of application No. 09/797,527, filed on Mar. 1, 2001, now Pat. No. 6,587,075.

(51) Int. Cl.
*H04B 7/185* (2006.01)
(52) U.S. Cl. .............................. 342/357.02; 342/357.06
(58) Field of Classification Search .......... 342/357.02, 342/357.03, 357.06, 357.09, 357.12, 465; 701/213, 215
See application file for complete search history.

(56) References Cited

U.S. PATENT DOCUMENTS

| | | | | |
|---|---|---|---|---|
| 5,583,972 | A * | 12/1996 | Miller .......................... | 345/419 |
| 6,256,602 | B1 * | 7/2001 | Ellis et al. ...................... | 703/8 |
| 6,373,432 | B1 * | 4/2002 | Rabinowitz et al. ... | 342/357.16 |
| 6,813,596 | B1 * | 11/2004 | Ellis et al. ...................... | 703/8 |
| 2001/0049284 | A1 * | 12/2001 | Liu et al. ..................... | 455/427 |
| 2004/0157554 | A1 * | 8/2004 | Wesel .......................... | 455/12.1 |

OTHER PUBLICATIONS

Draft Flight Information Advisory Service (FIAS) Collecting and Disseminating Aviation Information Through the Internet (23 pages) Date: Jan. 1, 1997; Version: 3.6.
The Role of LAAS in Acheiving Advanced Terminal Area Operations (18 pages); Date Oct. 9, 1998; Author: Air Transport Association.
SNC Business Proposal (27 pages).
AIRNAS Air Navigation and Airport Systems (6 pages); Author: Ingegneria Dei Sistemi S.P.A. (IDS).
Satellite Navigation Center "Acronym List with Definitions"; Date: Jun. 27, 1997; Author: Sharon Darnell.
"One-Stop-Shopping for Military GPS Users" (2 pages); Winter 1999-2000; Author: Ted Driver (The DoD Support Center).

(Continued)

*Primary Examiner*—Dao Phan
(74) *Attorney, Agent, or Firm*—Law Offices of John Chupa & Associates, P.C.

(57) ABSTRACT

A system 10 which is adapted to receive global positioning signals 14 from a satellite assembly 12 and which determines, displays, and selectively disseminates that error associated with the received signals to selected users at selected locations and at selected times. The system 10 also provides several other applications, including but not limited to the acquisition and selectively display of selective weather information, physical attributes of a facility, such as an airport, time distribution, collection and dissemination of user information as well as allowing one to simulate the performance of a global positioning acquisition and dissemination system. Such a simulation allows a user to dynamically specify the location and movement of signal generating satellites, the location of the various ground or reception stations, and to display certain other attributes or desired system characteristics. The simulation efficiently recognizes monitored ionospheric ground points which are used to allow for a more accurate overall simulation that can be delivered to selected users at selected locations and at selected times.

8 Claims, 4 Drawing Sheets

OTHER PUBLICATIONS

Flight Procedure Design and Airspace Management Icao Pansops Rules (FPDAM) (9 pages); Author: IDS.

The FAA and Satellite Navigation Operations and Maintenance Concept (18 pages); Date Jan. 21, 1997; Author: David R. Peterson (WAAS Project Leader).

Operational Requirement Document SNC (Draft) (8 pages); Date: Sept 1995; Author: FAA.

FAA Renovations-Bldg. 56; Author: Architectural Innovations, Inc.

GPS Production Team Technical and Scientific Support (Statement of Work); Date: May 1996.

Visual Security Operations Console (VSOC) and Integrated Security Solutions for USAF Force Protection; Author: Lamar Young (Sr. Program Manager).

"Interagency Agreement" Author: Federal Aviation Administration and The United States Naval Observatory; Date: Apr. 1, 1996.

"Wielding a Technological Edge, Firm Won, but Things Got Ugly" (7 pages); Date:Sep. 20, 1996; Author: William M. Carley.

Satellite Navigation Center Requirements (13 pages); Date: Nov. 12, 1996.

Satellite Navigation—Center of Excellence; Date: Jul., 1995; Author: Source Selection Sensitive.

Proposal U.S. Naval Observatory Participation in the Wide Area Augmentation System (WAAS); Date: Jul. 9, 1997; Authros: Dennis McCarthy, Demetrios Matsakis, James Ray.

"Avionics" Magazine; Mar. 2000.

Funding Criteria for Operations, Facilities and Equipment (F&E), and Research, Engineering and Development (R, E & D) Accounts; Date: Apr. 9, 1993.

Staffing Plan for the SatNav Center (7 pages).

3rd International Symposium GNSS—Genova Oct. 5-8, 1999.

SatNav Center Operational Description (3 pages).

"Tectonic Motion in the Pacific Basin"; Date: Dec. 20, 1997.

"Crustal Motions in the Tonga-Lau Island Arc System"; Date: Dec. 20,1997; Authors M. Bevis, F. Taylor, B. Schultz.

* cited by examiner

INFORMATION MANAGEMENT AND CONTROL SYSTEM

This application is a divisional of application Ser. No. 09/797,527, filed Mar. 1, 2001, now U.S. Pat. No. 6,587,075.

FIELD OF THE INVENTION

The present invention generally relates to an information management, collection, control, and delivery system and more particularly, to a system which is adapted to receive, monitor, process, and deliver content and positioning information to/from selected users at various locations and selected times, such as and without limitation, global positioning satellite information and which is further adapted to provide and/or dynamically create several applications, each of which, in one non-limiting embodiment of the invention are, respectively, resident upon a unique and separate computer hardware platform, effective to reduce software development and integration costs while concomitantly enhancing the overall reliability of the system and the provided processes and methodologies.

BACKGROUND OF THE INVENTION

Positioning information, such as global positioning information or Global Position System "GPS" type information which is provided by a satellite assembly, is typically received by one or more ground based receivers and/or by a ground based receiver assembly (e.g., surveyed locations), and is then selectively received, disseminated to or transmitted to a wide variety of individuals and business enterprises at the selected times for use within and/or by a wide variety of applications, including control applications within and/or from a satellite operation center. For example and without limitation, such information may be used to control and track the progress, position, and travel path of aircraft and other selectively movable apparatuses or systems and such information may be used to selectively track the progress, position, and travel path of individuals. Such information may also be used by individuals and operators of various apparatuses to determine a present location or position of an animate and/or inanimate object and to provide useful information to selected users various selected times.

While such positioning information is useful and widely used, it is oftentimes undesirably errant and provides inaccurate position information. Such undesired inaccuracies may be caused from a variety of sources, such as and without limitation, the ground based receiver assembly which initially receives the satellite based and/or generated position signal, destructive interference of the signals, and/or faults occurring within the satellites and/or within the processing assemblies which receive the signals from the ground based receiver.

Knowledge of the error occurring in the provided information allows a user and controller to be warned, in a timely manner, of the inaccurate information, effective to prevent the errant information from causing undesired results.

It is therefore desirable to provide a system and a method for determining the amount of error associated with position information and to reliably and readily disseminate the existence of and/or the amount of the determined error to a wide variety of users of the information in an efficient and timely manner. Other useful information can then also be disseminated to selected users at selected times using the same satellite operation center. These and other non-limiting advantages are provided by the present invention.

SUMMARY OF THE INVENTION

It is a first non-limiting advantage of the present invention to provide a system for receiving positioning information, for determining error associated with the received positioning information, and for selectively disseminating the existence and/or the amount of the determined error in an efficient manner to selected users at selected locations and selected times.

It is a second non-limiting advantage of the present invention to provide a system for allowing a user to simulate the performance of an information reception system, effective to allow a user at any location and time to create a positional information acquisition and dissemination system which achieves a desired level of operational performance.

It is a third non-limiting advantage of the present invention to provide a system for receiving certain positional information and for storing and selectively displaying certain information concerning the physical attributes and/or characteristics of a wide variety of facilities, such as and without limitation airports, bus terminals, train stations, boat terminals and/or any other transportation-related structures.

It is a fourth non-limiting advantage of the present invention to provide a system for receiving certain positional information and for determining the error associated with the received information by use of a spectrum analysis optimized for a specific location at a specific time for a specific type of user equipment.

It is a fifth non-limiting advantage of the present invention to receive and disseminate certain positional information and for using the positional information to track the progress of and/or to determine the position of an aircraft and the other aircraft close-by, other apparatus, or other animate or inanimate objects over specific area/locations and at specific times.

It is a sixth non-limiting advantage of the present invention to efficiently calculate and/or determine the existence of available or monitored ionspheric ground points, effective to allow a user of the system of the preferred embodiment of the invention to perform an operational simulation of a positional information acquisition and dissemination system in an efficient manner.

It is a seventh non-limiting advantage of the present invention to provide a positional information acquisition and dissemination system which is adapted to dynamically acquire and disseminate weather information in an efficient and relatively accurate manner to selected users at selected locations and at selected times.

It is an eighth non-limiting advantage of the present invention to provide a computer based positional information acquisition and dissemination system. Such a system is provided and includes a plurality of applications, each of which operatively reside upon a unique hardware platform. One such application may include information about reduced fuel prices from a user which can then be disseminated to selected users at the selected location and selected times.

It is a ninth non-limiting advantage of the present invention to provide a positional information and acquisition system which is adapted to distribute time related information in an efficient manner to selected users and applications.

According to a first aspect of the present invention, a system is provided for receiving certain positional information having certain error, for determining the amount of the certain error, and for selectively disseminating the determined amount of the certain error.

It is tenth non-limiting advantage of the present invention to provide a system for receiving time, velocity, and position information for application to various modes of transportation to enhance operational efficiency and safety.

According to a second aspect of the present invention, an assembly for simulating the operation of a global positioning information acquisition and dissemination system is provided. The system includes several selectively movable satellites and several ground reception stations, the assembly including a controller which operates under stored program control and which receives the position of the ground reception stations and the selectively movable satellites and which utilizes the received information to simulate the operation of the system.

According to a third aspect of the present invention, a method for determining the identity of available ionospheric grid points is provided. The method comprises the steps of selecting ionospheric pierce points; creating cells by use of the ionospheric pierce points; recognizing the corners of each of the created cells; discarding certain of the cells, thereby forming a residual group of cells; and identifying the available ionospheric grid points by use of the residual group of cells.

According to a fourth aspect of the present invention, a method is provided. The method includes the steps of receiving information; determining the amount of error associated with the received information; and displaying the received error.

These and other features, aspects, and advantages of the present invention will become apparent from a reading of the following detailed description of the preferred embodiment of the invention and by reference to the following drawings.

DETAILED DESCRIPTION OF THE PREFERRED EMBODIMENT OF THE INVENTION

Figure 1:
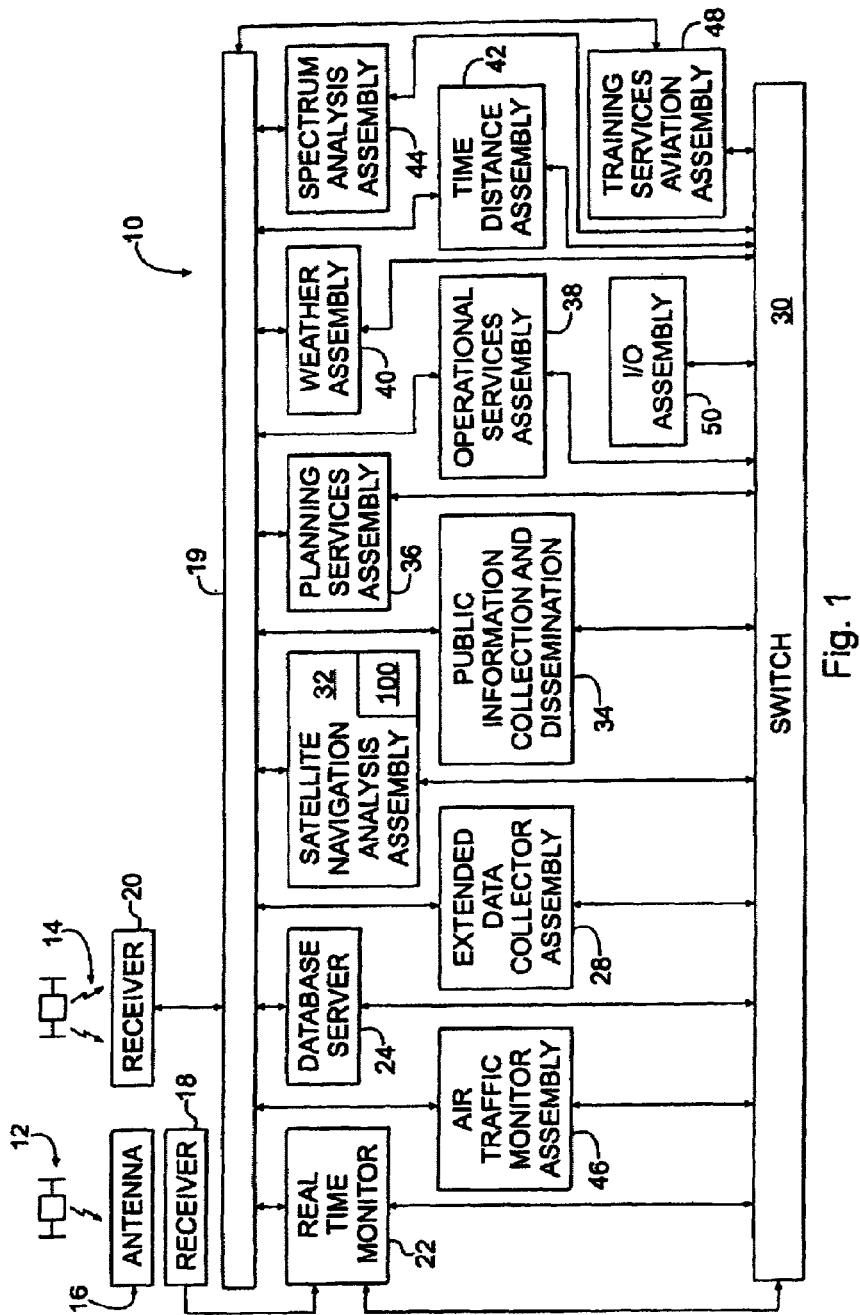
FIG. 1 is a block diagram of an information management and control system which is made in accordance with the teachings of the preferred embodiment of the invention and which is adapted to selectively receive positional and other information and to selectively disseminate the information as well as various features and attributes of the information in a relatively efficient manner.

Referring now to FIG. 1, there is shown an information management, control, and delivery system 10 which is made in accordance with the teachings of the preferred embodiment of the invention and which, as is more fully delineated below, is adapted to selectively receive certain positional and other information, to analyze certain attributes and/or characteristics of the received information for selected users, to selectively disseminate the received information as well as the attributes and/or characteristics of the received information as well as other attributes and characteristics, and to selectively receive and/or dynamically create other information which may be selectively disseminated and/or distributed in a relatively efficient manner to the various users of the system at the selected locations and at the selected times 10. Users can also selectively provide and send in information to be selectively distributed to other users.

As shown, system 10 is in communicative relationship with the global positioning satellite system 12 (e.g., a cooperating assembly of satellites) which are adapted to cooperatively provide positioning signals 14. As should be apparent to those of ordinary skill in the art, signals 14 cooperatively form a global positioning signal (e.g., provide information which may be used to determine the position of an animate or inanimate object).

System 10 includes at least one antenna 16 and a receiver 18 which is physically and communicatively coupled to the antenna 16. In one non-limiting embodiment of the invention, system 12 comprises a navigational constellation of twenty-four satellites which was created by the United States Government. Other types of positional information signals may also be analyzed by the System 10 and nothing in this application should limit the scope of the claimed inventions to only this satellite constellation 12.

System 10 also includes a commercially available and "certified" global positioning satellite receiver assembly 20. Both receiver assembly 20 and the cooperative combination of the antenna 16 and receiver 18 are adapted to receive the positioning signals 14 which emanate from the global positioning satellite system 12 and, upon respective receipt of these signals, (and surveyed position information), to calculate and generate respective signals which are substantially representative of the respectively received signals.

System 10 further includes a real time monitor 22 which is communicatively coupled to the receiver 18 and which is further communicatively coupled to a local area network or "communications backbone"/communications facility 19. Particularly, the network 19 may comprise a commercially available communications network using, by way of example and without limitation, the TCP/IP communications protocol and may further utilize cable or a fiber optic physical transfer medium. Particularly, network 19 allows the real time monitor 22 to communicate with the receiver 20.

The real time monitor 20, in one non-limiting embodiment, comprises a controller which operates under stored program control and which is operatively adapted to determine the amount of error occurring within the signal emanating from the receiver 18. In one non-limiting embodiment of the invention, the amount of this error is substantially equal to the differences between the value emanating from the receiver 18 for a "certain" position (e.g., the position at which system 10 resides), the value emanating from the receiver 20 for the same "certain" position, and the surveyed position. Moreover, the amount of error occurring at a "different position" (e.g., a position far removed or remote from the system 10) may be calculated by noting the distance between the certain position, surveyed position, and the different position and then multiplying the calculated error at the position of system 10 by this differential distance. In the most preferred embodiment of the invention, real time monitor assembly 22 stores a threshold value and uses this threshold value to determine whether the amount of error is unacceptable, thereby simplifying the overall error reporting application by obviating the need to transmit or provide additional information to some users when the error is below some desired error threshold value. Further, by comparing the "raw GPS" signal, which emanates from the receiver 18, to the surveyed location and the signal which emanates from the certified receiver 20, the need for augmented GPS is avoided, thereby simplifying the overall strategy and system.

System 10 further includes a database server 24 which is communicatively coupled to the real time monitor 22 by the use of network or "backbone" communications facility or local area network 19. Particularly, in one non-limiting embodiment of the invention, the database server 24 comprises a controller which operates under stored program control and which receives information from the real time monitor 22, archives or stores the received information, and allows a user of the system 10 to selectively access the previously stored information, thereby allowing the user to selectively determine the amount of error currently present within the signals 14 in substantial "real time" and over some predetermined or "archived" period of time and over some area.

System 10 further includes an extended data collection assembly or portion 28 which is communicatively coupled to the network or facility 19 thereby causing the extended data collection assembly 28 to be in communication with the real time monitor assembly 22 and the database server 24. The extended data collection assembly 28, in one non-limiting embodiment of the invention, comprises a controller which operates under stored program control and is further communicatively and controllably coupled to a wide variety of networks, including a global communications network or the Internet, through switch 30. As shown, switch 30 is also communicatively coupled to the real time monitor 22 and to the database server 24, thereby allowing the real time monitor 22 and the database server 24 to be selectively accessed by a remote user and/or a remote network. Particularly, in one non-limiting embodiment of the invention, extended data collection assembly 28 selectively and regularly queries various publicly available sources of information regarding the accuracy of the signals 14 and makes this information available to a users of the system at selected locations and selected times 10. For example and without limitation, the assembly 28 selectively queries the information provided by the United States Coast Guard and other non-United States based information sources in order to allow a user of the system 10 to have access to a wide variety of error reporting sources regarding the performance of the satellite constellation 12 at selected locations and selected times 12.

System 10 further includes a satellite navigational analysis assembly 32 which is communicatively and controllably coupled to the network or facility 19 and which is further communicatively coupled to the switch 30. Hence, the satellite navigational analysis assembly which, in one non-limiting embodiment of the invention comprises a controller operating under stored program control, is in a communication relationship with all of the other assemblies which are also communicatively coupled to the network 19 and to a wide variety of remote networks or users who are respectively and selectively coupled to the switch 30 in a remote manner at selected times and from selected locations.

Particularly, in this one non-limiting embodiment of the invention, assembly 30 queries external sources of information concerning the published and calculated performance of various types of global positioning augmentation systems, such as and without limitation, a ground based or wide area augmentation system, as well as the performance of various international (e.g., non-United States based) satellite positioning system, such as the Gallileo system. Further, in a non-limiting embodiment of the invention, the satellite navigational analysis assembly 32 generates reports which detail inaccuracies of the satellite constellation 12, of receivers 18, 20, and any errors associated with the signals 14, thereby determining how well the receivers 18 and 20 are performing and the overall accuracy of the provided and/or received positional data. In another non-limiting embodiment of the invention, satellite navigational analysis system 32 is also adapted to determine the source of such undesired positional error (e.g., a malfunction of the receivers 20 or 18 or errant signals 14) and generates corrective measures in order to ensure that the sensed difficulties are overcome or addressed.

System 10 additionally includes a public collection and dissemination assembly 34 which, in one non-limiting embodiment comprises a controller which operates under stored program control and which is communicatively coupled to the network 19 and to the switch 30. Hence, public dissemination assembly 34 is in a communicative relationship with all of the other assemblies, within system 10, which are communicatively coupled to the network 19 and to all users and entities which are communicatively coupled to the switch 30. In one non-limiting embodiment of the invention, the public dissemination assembly is adapted to selectively receive information from the other assemblies which are communicatively coupled to the network 19 and to disseminate the received information by the use of the switch 30. Assembly 34, in another non-limiting embodiment of the invention, will also collect and reciecve data and information from users that will then disseminated to other selected users at the selected locations and selected times.

System 10 also includes a planing services assembly 36 which is communicatively coupled to the facility or network 26 and which is communicatively coupled to the switch 30, thereby being in a communication relationship with all of the other assemblies which are communicatively coupled to the network 19 and to all networks, users, and/or other assemblies which are communicatively coupled to the switch 30.

In one non-limiting embodiment of the invention, the planning services assembly 36 is adapted to selectively design, store, retrieve, and communicate information concerning the physical attributes of and procedures associated with various airports and airport facilities. For example and without limitation, the planning services assembly 36 stores and selectively disseminates/provide information concerning the respective approach procedures for airports, the respective terminal procedures for airports, the respective capacity for airports, the physical attributes and characteristics of each of the airports (e.g., the location of the respective runways as well as the height and shape of adjacent buildings), a flight simulator, an air traffic control simulator, and the en-route or "in flight" procedures required by various governments or airport and other transportation authorities. In one non-limiting embodiment of the invention, these procedures are delivered to a user, through switch 30, in a substantially "real time" manner and may be updated in a substantial "real time" manner to reflect the dynamic changes occurring in this information (e.g., a war may cause one or more portions of an airport to be destroyed or substantially changed). In yet another non-limiting embodiment of the invention, the stored and selectively disseminated physical attribute information is verified by satellite images and changed in accordance with received satellite image information. In another non-limiting embodiment of the invention, planning services assembly 36 will provide/ disseminate status and information on global positioning satellite systems to users at the appropriate locations where planning operations (e.g. those associated with an airline) can be performed with the latest information on the capabilities that can be provided at a remote location.

System 10 further includes an operational services assembly 38 which is communicatively coupled to the switch 30 and to the network 19 and which is thereby in a communicative relationship with all of the other assemblies which are communicatively coupled to the network 19 and with all of the other users, networks, and entities which are communicatively coupled to the switch 30. In one non-limiting embodiment of the invention, operational services assembly 38 comprises a controller which operates under stored program control and which selectively receives and stores information from pilots and other aircraft personnel about various airports and airport facilities, thereby allowing any warnings or information about an airport to be made readily available to the users of the system 10. Further, operational services assembly provides air traffic control information to users of the system 10 (e.g., the distance needed to "see the runway" before a landing may be accomplished based on current weather conditions or performance/errors associated with the signals 14). The operational services assembly 38 further includes a "certification" application which determines whether the global positioning signals 14 are of sufficient accuracy to allow certain operations to safely occur. In one non-limiting embodiment of the invention, the operational services assembly includes several predefined theresholds which are respectively associated with a certain error range of the signals 14. A "highly accurate" range is associated with relatively little error in the signals 14 and when the assembly 38 determines that the signals are operating in an highly accurate range, they may be used by an aircraft for landing or navigational purposes. A "medium range" is associated with relatively high error in the signals 14 and when the signals 14 are resident within this range, assembly 38 so notifies the users of the system 10 and the signals 14 and the provided positional information may then be only used for non-critical position applications, such as for determining the position of an automobile or person. Other distinct ranges or thresholds may be selectively utilized by and/or within system 10.

System 10 further includes a training services assembly 40 which selectively provides simulations of certain portions of airports (e.g., runways) and allows a user to simulate the landing of an aircraft upon a runway. An unacceptable range is associated with unacceptably large error in the signals 14 and, in this situation, assembly 38 notifies the users of system 10 that the signals 14 and the provided positional information should not be used at all and for any purpose. In this manner, the users of the system 10 are provided with relatively simple and easy to understand ranges instead of the often confusing error or "raw" GPS data.

System 10 further includes a weather service assembly 40 which comprises a controller which is operable under stored program control and which is communicatively coupled to the network 19 and to the switch 30, thereby being in communicative relationship with all of the other assemblies which are communicatively coupled to the network 19 and being communicatively coupled to all of the other networks, users, and assemblies which are communicatively coupled to the switch 30. In one non-limiting embodiment of the invention, the weather assembly 40 selectively receives and provides weather information concerning the weather occurring at various airports or other facilities and/or locations.

Further, System 10 includes a time distribution assembly 42 which comprises a controller which operates under stored program control and which is communicatively coupled to the network 19 and to the switch 30, thereby allowing the time distribution assembly to be in communicative relationship with all of the other assemblies which are communicatively coupled to the network 19 and to all of the other users, networks, and entities which are communicatively coupled to the switch 30.

Particularly, the time distribution assembly 42 provides a signal which comprises a substantially accurate representation of time and which provides this "time representative signal" to the other assemblies which are coupled to the network 19 and to the assemblies and users which are coupled to the switch 30. In one non-limiting embodiment of the invention, the time signal is derived by sampling at certain respective intervals of time, the signals emanating from the receivers 18, 20. Respective signals, from receivers 18 and 20, which are sampled at the same time are mathematically averaged and these averaged signals are used to create a curve (e.g., by the least squares curve fitting method). The curve is then used to extrapolate time and the extrapolated time is provided to the network 10 and to the switch 30.

System 10 further includes a spectrum analysis assembly 46 which comprises a controller which is operable under stored program control and which is communicatively coupled to the network 19 and to the switch 30 and which is therefore in a communicative relationship with all of the other assemblies which are communicatively coupled to the network 19 and with all of the other networks, entities, and assemblies which are communicatively coupled to the switch 30. In one non-limiting embodiment of the invention, the spectrum analysis assembly 44 monitors the amount of interference which may occur to the signals 14 and provides a warning signal when the amount of monitored interference is unacceptably high. By way of example and without limitation, the spectrum analysis assembly 44 calculates the signal to noise ratio of the signal emanating from the receiver 18 and when the ratio is unacceptably low (e.g., the noise is relatively high), provides the previously delineated warning signal.

System 10 further includes an air-traffic monitor analysis assembly 46 which utilizes the positioning signal 14 to track and disseminate the position and movement or aircraft and other vehicles in relationship to each other. In one non-limiting embodiment of the invention, the air-traffic monitor analysis assembly 46 comprises a controller which operates under stored program control and which is communicatively coupled to the network 19 and to the switch 30, thereby being in a communicative relationship with all of the other assemblies which are communicatively coupled to the network 19 and to all of the other networks, entities, users, and assemblies which are communicatively coupled to the switch 30.

System 10 further includes a training services aviation assembly 48 which, in one non-limiting embodiment of the invention, comprises a controller which is operable under stored program control and which is communicatively coupled to the network 19 and to the switch 30. Hence, the assembly 48 is in a communicative relationship with all of the other assemblies which are communicatively coupled to the network 19 and to all of the other assemblies, users, networks, and entities which are communicatively coupled to the switch 30.

In one non-limiting embodiment of the invention, the training services aviation assembly 48 provides an aircraft simulator application which allows a user, by use of a computer which is communicatively coupled to the assembly 48, to simulate the operation of an aircraft. Assembly 48 may also provide details concerning the procedures of airports and various charts and maps of various locations around the world.

System 10 may further include an input/output assembly or "I/O" assembly 50 which is communicatively coupled to the network 19 and to the switch 30 and which is in a communicative relationship with the assemblies which are communicatively coupled to the network 19 and to those networks, entities, assemblies, and users which are communicatively coupled to the switch 30. In one non-limiting embodiment of the invention, the assembly 50 comprises a collection of scanners, printers, and storage devices to which and from which data may be stored and provided to the entities/assemblies/uses which are communicatively coupled to the network 19 or the switch 30. Assembly 50 may also include a GPS clock for operational use by the assemblies which are communicatively coupled to the network 19 or the switch 30.

Another non-limiting embodiment of the invention provides a system for receiving time, velocity, and position information for application to various modes of transportation of enhance operational efficiency and safety.

Figure 2A:
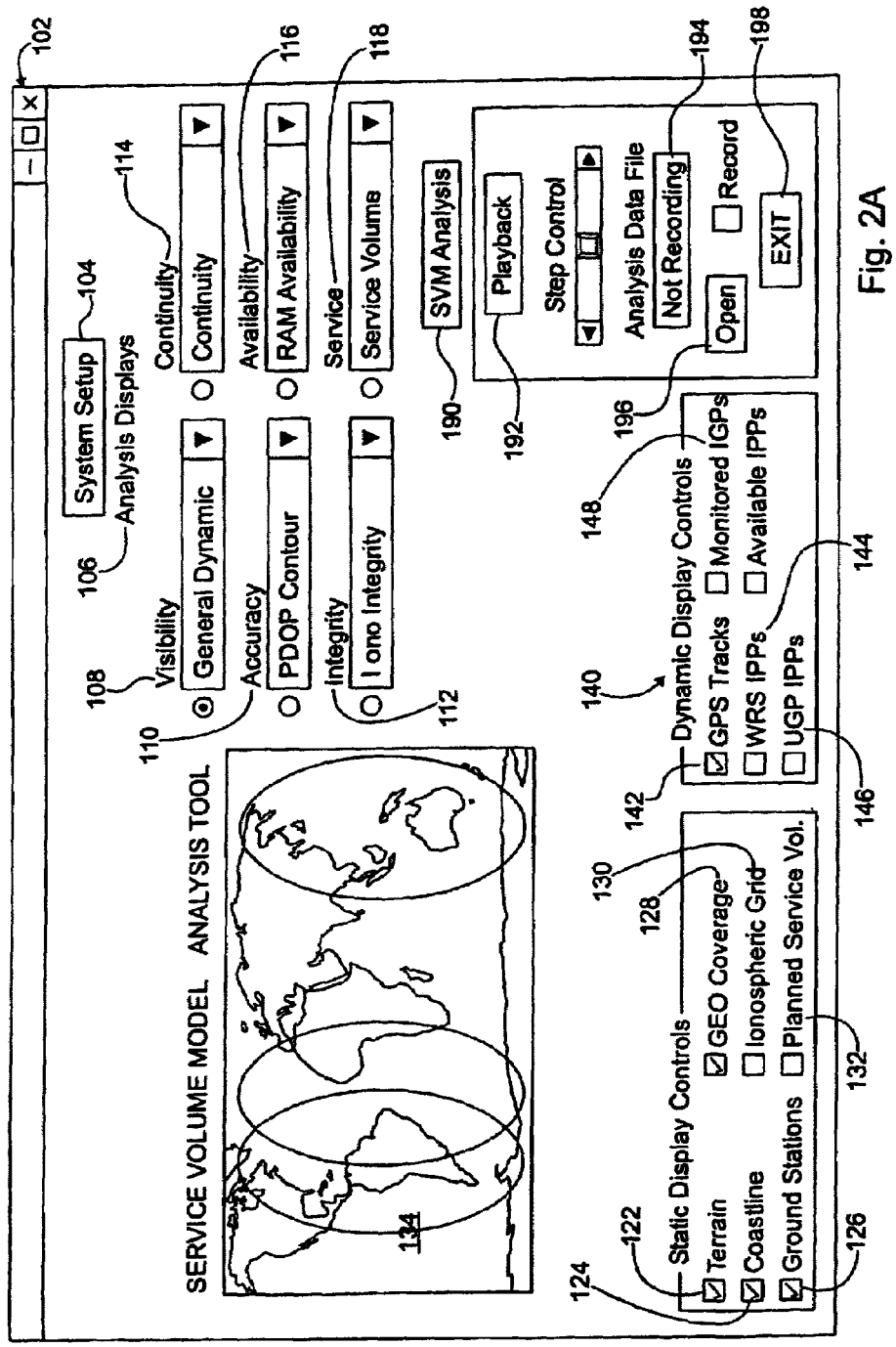
FIGS. 2(a–b) are screen displays illustrating a simulation tool which is included within the information management and control system which is shown in FIG. 1.

Referring now to FIGS. 2(a–b), there is shown screen displays associated with and/or created from a simulation analysis tool which may be selectively used by a user of system 10, which may be operatively included within any of the assemblies 24–48, and which is adapted to allow the user to create a certain system configuration and to analyze the efficacy of the selected configuration; to allow a user to determine whether a certain system configuration meets certain criteria; and to allow a user to determine the optimal location for the placement of ground reception stations or assemblies. It should be understood that, in this context, the term "system configuration" refers to the type and placement of receivers which are adapted to selectively receive signals 14.

As shown, simulation analysis tool 100 includes a first portion or screen of information 102 having a first portion 104 which is entitled "system setup" and which allows a user to specify certain attributes of a desired and/or an existing system in order to allow the simulation tool 100 to perform the desired analysis. Information screen 102 further includes a second section 106 which is entitled "analysis displays" and which includes subsections 108–118 which are respectively entitled "visibility", "accuracy", "integrity", "continuity", availability", and "service volume" and which, as is more fully delineated below, cause the display to include certain attributes.

Further, informational screen 102 includes a third section 120 which has entries 122–132 which are respectively entitled "terrain", "coastline", "ground station", "map grid", "ionospheric grid", and "planned service volume". Particularly, a respective selection of entries 122–132 causes the display portion 134 of the informational screen 102 to selectively display the terrain of a certain area, the coastline (if any) which may be located in the desired area, the location of ground reception stations within this desired area, a grid which is superimposed over the desired area, the portion of the ionspheric grid which overlays the displayed region or area, and a planned service volume (e.g., the volume into which signals 14 must be received and for which positional information will be disseminated).

Information screen 102 further includes a fourth display portion 140 which is entitled "dynamic display controls" and which has entries 142–148 which are respectively entitled "GPS tracks", "WRS IPPS", UGP IPPS", and IGP Monitoring". Particularly, a selective activation of entry 142 causes the display portion 134 to display the position and movement of all of the satellites which operatively reside within the satellite assembly 12. A selective activation of the entry 144 causes the display portion 134 to display the line of sight relationship between each ground station and each of the satellites within the assembly 12 through the ionosphere. A selective activation of the entry 146 allows the user to select grid points within the planned service volume, effective to allow the user to create reference points at which certain calculations may be made. A selective activation of entry 148 causes the display portion 134 to display the movement of the ionospheric grid points over the planned service volume.

Figure 2B:
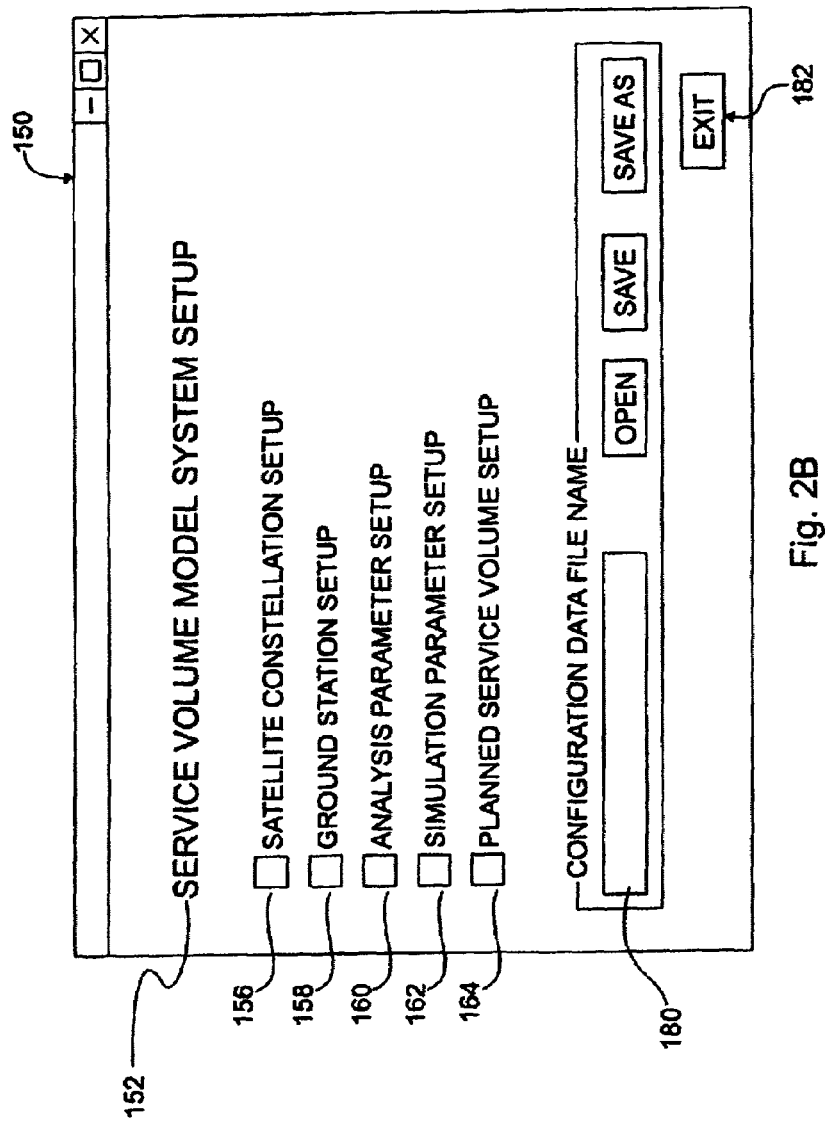

As shown best in FIG. 2(b), the selection of display portion 104 causes the information screen 150 to be displayed. Particularly, information screen 150 includes a header portion 152 which is entitled "Service volume model system setup" and associated and selectively activated entries 156–164 which are respectively entitled "satellite constellation setup", "ground station setup", "analysis parameter setup", "simulation parameter setup", and "planned service volume setup".

Particularly, an activation or selection of entry 156 allows the user to identify each of the operating satellites, their respective positions, and their movement attributes, effective to allow the simulation system 100 to locate and dynamically simulate the positional movements of these satellites. An activation or selection of entry 158 allows the user to identify each of the ground stations within the planned service volume. An activation or selection of entry 160 allows the user to specify the accuracy required by the positional data (e.g., specify the use in a precision or non-precision approach) as well as allowing the user to specify the requirements of the wide area augmentation system or "WAAS". An activation or selection of entry 164 allows the user to specify the geometric coordinates of the planned service volume.

Information display 150 further includes a portion 180 in which the previously delineated data may be "named" or identified and stored for later use. A selective activation of portion 182 which is entitled "EXIT" allows a user to return to the informational screen 102.

Referring again to portion 106, in one non-limiting embodiment of the invention, each of the entries 108–118 may have a selected one of two values for each of the ground stations which are selected or defined by a user. That is, an entry 108 has a first value if the display portion 134 is to warn the user of one or more of the satellites, within the satellite assembly 12, are not "visible" to a previously defined ground station within the planned service volume and a second value if the display portion 134 is not to provide this information to the user. Alternatively, entry 107 allows a user to specify which of the satellites are "visible" or communicatively coupled to each of the previously specified ground stations. Entry 110 has a first value if the display portion 134 is to inform the user whether signals 14, appearing within the planned service volume cooperatively provide a certain level of positional accuracy, to each of the previously delineated ground stations, and a second value if this information is not to be provided. Entry 100 also allows the user to specify whether each ground station provides a certain level of desired positional accuracy. Entry 112 has a first value if the display portion 134 is to display the absence of a "real" signals 14 to each of the ground stations within some predetermined threshold of time and a second value if it is to not display this occurrence. Entry 112 allows the user to specify or program a certain defined absence of the "real"

signals for one or more of the previously delineated ground stations. Entry 114 has a first value if the display portion 134 is to warn the user of the occurrence of discontinuity (e.g., the absence of the receipt of any signals) during some time period, and a second value if such a warning is not to be provided. The entry 114 allows a user to specify a certain amount of discontinuity for each of the ground stations. Entry 116 has a first value if the display portion 134 is to calculate and display the availability for each of the ground stations and a second value if the display portion 134 is not to provide the information. In one non-limiting embodiment of the invention, "availability" for a ground station is related to the accuracy, integrity, and continuity of a ground station. For example and without limitation, a ground station which provides an accurate signal without interruption has a high availability and one that does not has a low availability. The entry 116 allows the user to specify the availability for each of the ground stations. Entry 118 has a first value which causes the display portion 134 to display the created service volume and a second entry which prevents the display of the planned service volume.

Display portion 134 further includes a portion 190 which causes the tool 102 to perform a simulation and a portion 192 which allows the previously performed simulation to be "played back" in a dynamic and selected manner. Display portion 102 further includes entries 194, 196, and 198 which are respectively entitled "Save Analysis Data", "Open Analysis Data", and "EXIT". A selection of these entries 194, 196, and 198 causes the analysis data to be saved, retrieved, and allows the user to exit the simulation mode of simulation tool.

Figure 3:
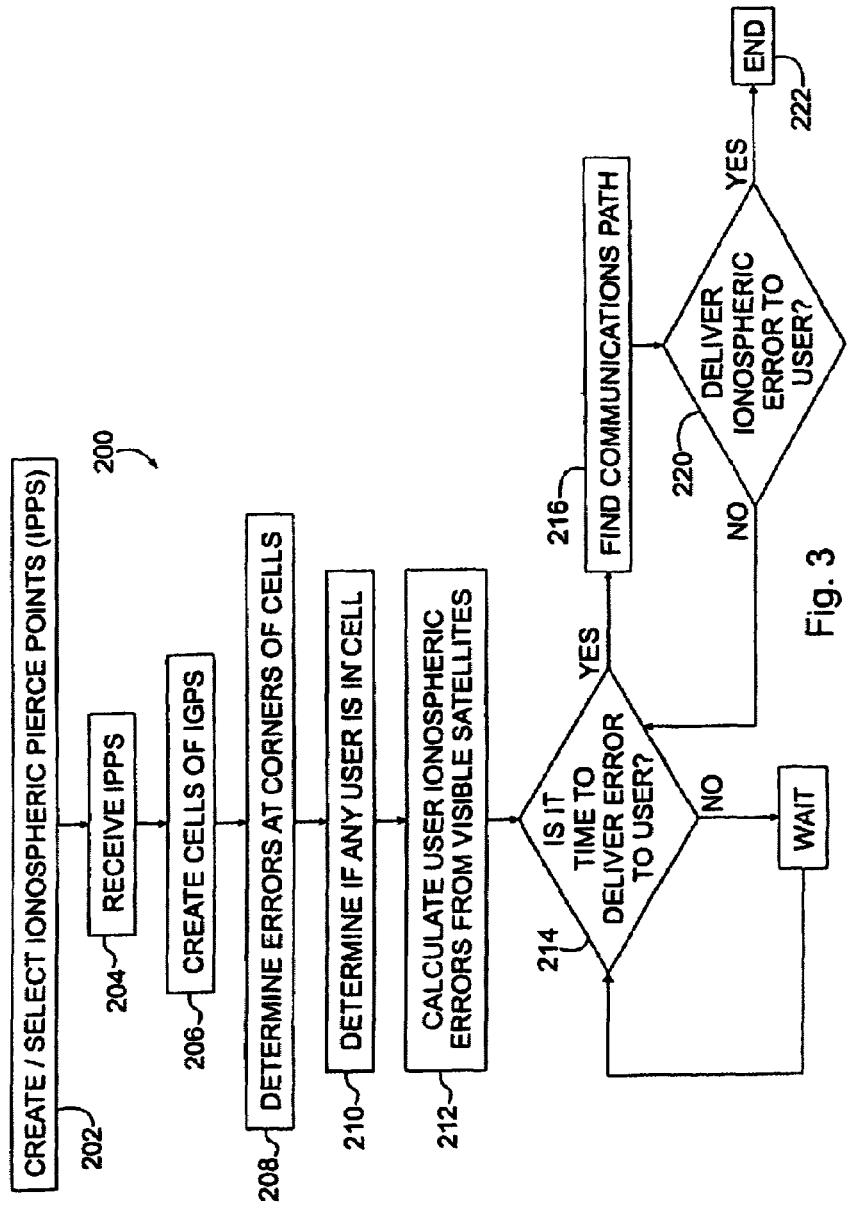
FIG. 3 is a flowchart illustrating a sequence of steps associated with the methodology, used by the preferred embodiment of the invention, to identify monitored or available ionospheric ground points.

In the preferred embodiment of the invention and during the foregoing simulation, the use of "monitored ionspheric ground points" or "IGPs" is required. In the preferred embodiment of the invention, the recognition of these IGFs is done in a very fast and efficient manner as shown by IGP recognition and/or creation methodology or flowchart 200 of FIG. 3.

Specifically, methodology 200 begins with an initial step 202 in which ionspheric grid points or ("IPPs") are selected or created. That is, as should be apparent to those of ordinary skill in the art, these IPPs are readily known and identifiable based upon the service volume area that is to be utilized. Step 204 follows step 202 and, in this step 204, the delineated points are received and stored within the system 10. Step 206 follows step 204 and, in this step 206, bands and cells (within each of the bands) of ionspheric grid points (IGPs) are selected. As should be realized by those of ordinary skill in the art, the IGPs are defined for the ionosphere and, in this step 206, a certain amount of these points are selected based upon the desired service volume area.

Step 208 follows step 206 and, in this step 208, the errors at the corners each cell are determined, and identified. Step 210 follows step 208 and, in this step 210, all of the user cells are identified and those without at least one IPP are discarded. Step 212 follows step 210 and, in this step 212, user errors are calculated. Step 214 follows step 212 and, in this step 214, the system 10 determines whether it is time to send errors to users. Step 216 follows step 214 and the communication path is found, selected, and/or defined by a user. The communication path, in one non-limiting embodiment of the invention is defined as a path from the user (e.g., from a certain position or ground receiver) to a satellite or to a certain point. Alternatively, step 218 follows step 214 and the time is denoted as "not yet". Steps 216 and 218 are followed by step 220 in which the system 10 delivers ionospheric errors to the users.

It is to be understood that the invention is not limited to the exact construction and methodology which has been delineated above, but that various changes and modifications may be made without departing from the spirit and scope of the inventions as are more fully delineated in the following claims.

What is claimed is:

1. An assembly for simulating the operation of a global positioning information acquisition and dissemination system to/from selected users at a selected locations and selected times, including several selectively movable and un-movable satellites and several ground reception stations, said assembly including a controller which operates under stored program control and which receives the position of said selected ground reception station and said selectively movable and un-movable satellites and which utilizes said received position information selectively to simulate the operation of said system for selected users at selected locations and at selected times.

2. An assembly which allows at least one selectively movable ground station to be specified within a certain service volume, which allows at least one selectively movable satellite to be specified, and which simulates the operable interaction between the at least one selectively movable ground station and said at least one selectively movable satellite within said certain service volume as the satellite and the ground station move within said service volume, thereby allowing the system to be optimally configured.

3. The assembly of claim 2 further comprising a portion which allows the created simulation to be selectively replayed.

4. The assembly of claim 3 wherein said assembly specifies whether a certain level of positional accuracy is provided by said at least one ground station.

5. The assembly of claim 4 wherein said assembly provides an indication of the absence of a simulated communication between said at least one satellite and said at least one ground station over same period of time.

6. An assembly which is adapted to allow a user to create a certain system configuration comprised of at least one satellite and at least one ground station and to allow a user to determine whether said certain system configuration meets certain predetermined criteria, and to allow a user to determine an optimal location for the placement of said at least one ground station within a certain service volume.

7. The assembly of claim 6 further having a portion which allows at least one attribute of said at least one satellite and at least one attribute of said service volume to be defined.

8. The assembly of claim 7 wherein said at least one attribute of said at least one satellite includes the movement of said at least one satellite.

* * * * *